United States Patent
Sakamoto

(10) Patent No.: US 9,374,234 B2
(45) Date of Patent: Jun. 21, 2016

(54) METHOD OF CONTROLLING INFORMATION PROCESSING APPARATUS AND INFORMATION PROCESSING APPARATUS

(71) Applicant: FUJITSU LIMITED, Kawasaki-shi, Kanagawa (JP)

(72) Inventor: Takuya Sakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 229 days.

(21) Appl. No.: 13/771,730

(22) Filed: Feb. 20, 2013

(65) Prior Publication Data

US 2013/0318161 A1   Nov. 28, 2013

(30) Foreign Application Priority Data

May 28, 2012   (JP) ................................. 2012-120865

(51) Int. Cl.
*H04L 12/18* (2006.01)
*G09B 5/00* (2006.01)
*G09B 7/02* (2006.01)

(52) U.S. Cl.
CPC .............. *H04L 12/1827* (2013.01); *G09B 5/00* (2013.01); *G09B 7/02* (2013.01); *H04L 12/1818* (2013.01); *H04L 12/1822* (2013.01)

(58) Field of Classification Search
CPC ......... G06F 17/40; G06F 3/048; G06F 15/16; G06F 12/14; G06F 15/177; G06F 17/00; G06F 17/30; G06F 17/30011; G06F 17/30017; G06F 17/3074; G06F 17/30781; G06F 21/00; G06F 21/10; G06F 21/12; G06F 21/121; G06F 21/30; G06F 21/31; G06F 11/00; G06F 11/30; G06F 11/3051–11/3058; G06F 11/3089–11/3096; G06F 13/00; G06F 13/14; G06F 15/00–15/0233; G06F 15/025; G06F 15/0283; G06Q 10/00; G06Q 10/02; G05B 1/00; H04L 12/16; H04L 51/04; H04L 65/403; H04L 41/00; H04L 41/08–41/0806; H04L 41/0813; H04L 41/085; H04L 41/0866–41/0869; H04L 41/0876–41/0886; H04L 41/0893; H04L 67/00; H04L 67/10; H04L 67/104–67/1048; H04L 67/14; H04L 67/141; H04L 67/18; H04L 67/22; H04L 67/24; H04L 67/30–67/306; H04L 67/32; H04L 7/00; H04L 51/00; H04L 51/02; H04L 51/046; H04L 51/10; H04L 51/16; H04L 51/18; H04L 51/20; H04L 65/00; H04L 65/40; H04L 67/16; H04L 67/20; H04L 67/325; H04M 11/00
USPC .......................... 709/201, 203–205, 223–226
See application file for complete search history.

(56) References Cited

U.S. PATENT DOCUMENTS 5,309,146 A * 5/1994 Kenet ............................ 340/540
6,035,404 A * 3/2000 Zhao ................................ 726/6

(Continued)

FOREIGN PATENT DOCUMENTS

JP    11046191 A    2/1999
JP    11046191 A    2/1999

(Continued)

OTHER PUBLICATIONS

Japanese Office Action mailed Feb. 2, 2016, for Japanese Patent Application 2012-120865 (Partial English translation provided).

*Primary Examiner* — Brian J Gillis
*Assistant Examiner* — Boris Grijalva Lobos
(74) *Attorney, Agent, or Firm* — Oblon, McClelland, Maier & Neustadt, L.L.P.

(57) ABSTRACT

A method of controlling an information processing apparatus includes obtaining user information related to users of information terminals in a place, and obtaining, by a processor, change information related to a change in the user information.

16 Claims, 14 Drawing Sheets

(56) References Cited

U.S. PATENT DOCUMENTS

| | | | |
|---|---|---|---|
| 6,244,758 B1* | 6/2001 | Solymar et al. | 709/224 |
| 6,526,341 B1* | 2/2003 | Bird et al. | 701/31.4 |
| 6,571,287 B1* | 5/2003 | Knight et al. | 709/225 |
| 6,781,963 B2* | 8/2004 | Crockett et al. | 370/260 |
| 6,793,575 B2* | 9/2004 | Brown et al. | 463/6 |
| 7,874,920 B2* | 1/2011 | Hornik et al. | 463/42 |
| 8,087,990 B2* | 1/2012 | Lind et al. | 463/19 |
| 8,352,296 B2* | 1/2013 | Taneja et al. | 705/5 |
| 8,446,455 B2* | 5/2013 | Lian et al. | 348/14.09 |
| 8,515,490 B2* | 8/2013 | Moganti | 455/556.1 |
| 8,682,704 B2* | 3/2014 | Nease et al. | 705/7.19 |
| 8,743,171 B2* | 6/2014 | Hiller et al. | 348/14.01 |
| 8,898,231 B2* | 11/2014 | Crawford et al. | 709/204 |
| 9,165,289 B2* | 10/2015 | Motoyama | G06F 21/6218 |
| 2003/0187982 A1* | 10/2003 | Petit | 709/225 |
| 2005/0058088 A1* | 3/2005 | Decker et al. | 370/260 |
| 2005/0275716 A1 | 12/2005 | Shingu et al. | |
| 2006/0156209 A1* | 7/2006 | Matsuura et al. | 714/798 |
| 2007/0143433 A1* | 6/2007 | Daigle | 709/207 |
| 2007/0162315 A1* | 7/2007 | Hodges | 705/8 |
| 2007/0268130 A1* | 11/2007 | Yee et al. | 340/540 |
| 2008/0010347 A1* | 1/2008 | Houghton et al. | 709/205 |
| 2009/0319917 A1* | 12/2009 | Fuchs et al. | 715/753 |
| 2010/0015945 A1* | 1/2010 | Shuman et al. | 455/406 |
| 2010/0049579 A1* | 2/2010 | Suzuki | 705/9 |
| 2010/0093438 A1* | 4/2010 | Baszucki et al. | 463/42 |
| 2010/0259611 A1* | 10/2010 | Keshavarzian et al. | 348/143 |
| 2010/0332615 A1* | 12/2010 | Short et al. | 709/217 |
| 2011/0112702 A1* | 5/2011 | Huizenga et al. | 700/295 |
| 2012/0215617 A1* | 8/2012 | Shah et al. | 705/14.35 |
| 2013/0018951 A1* | 1/2013 | Piccinini et al. | 709/204 |
| 2013/0108033 A1* | 5/2013 | Buzdugan | 379/202.01 |
| 2014/0149519 A1* | 5/2014 | Redfern et al. | 709/206 |
| 2015/0010167 A1* | 1/2015 | Arling | 381/105 |

FOREIGN PATENT DOCUMENTS

| | | |
|---|---|---|
| JP | 2003304518 A | 10/2003 |
| JP | 2005-352933 | 12/2005 |
| JP | 2005352933 A | 12/2005 |
| JP | 2008-257441 A | 10/2008 |
| JP | 2009-069989 A | 4/2009 |
| JP | 2010-049456 A | 3/2010 |
| JP | 2010-236881 A | 10/2010 |
| JP | 2010-236881 A | 10/2010 |

* cited by examiner

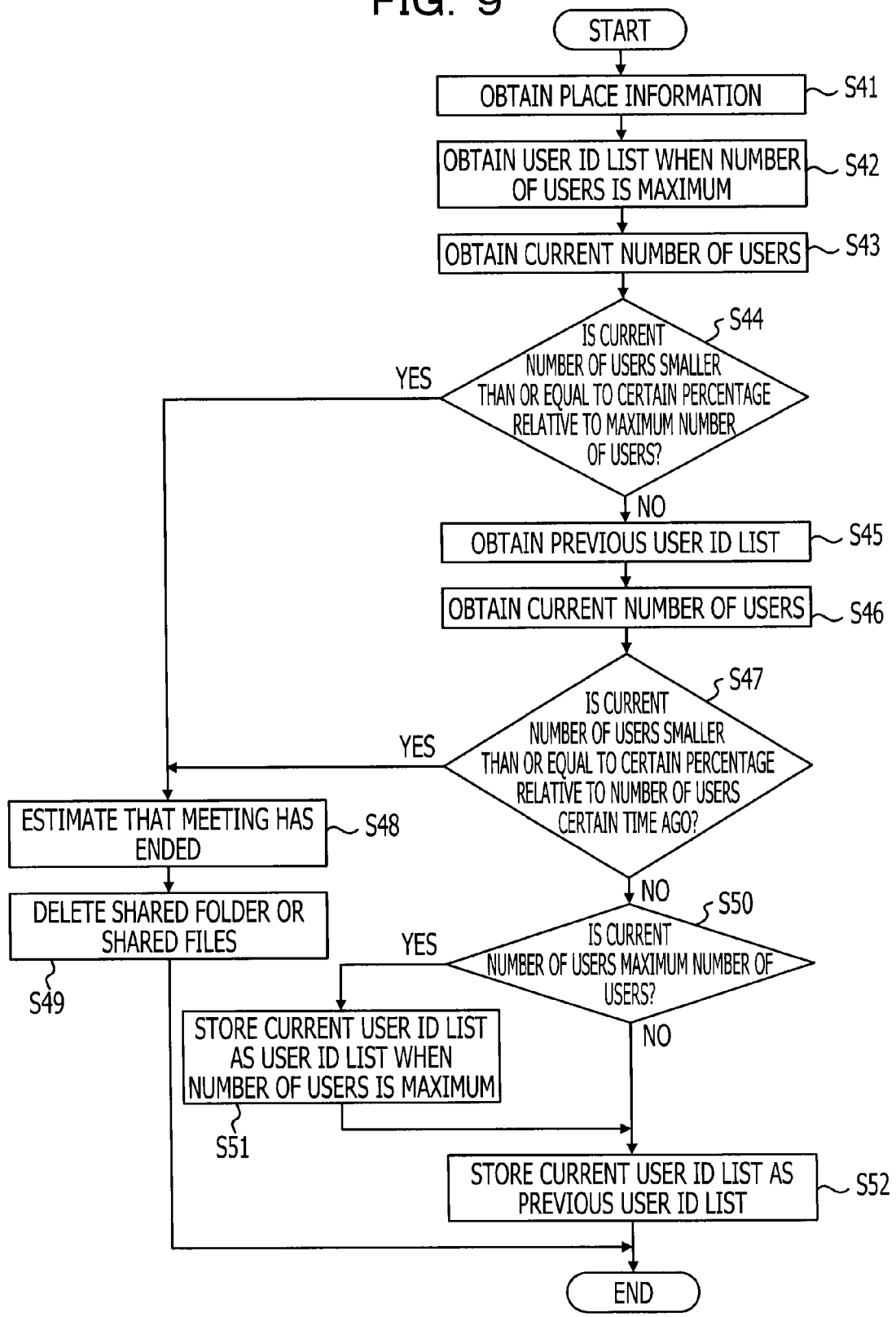

FIG. 10A

| PLACE ID | BSSID | RADIO FIELD INTENSITY (-dB) |
|---|---|---|
| P0001 | 00:11:22:33:44:55 | 50 |
| P0002 | 11:22:33:44:55:66 | 60 |

FIG. 10B

| PLACE ID | USER ID |
|---|---|
| P0001 | [U0001,U0002,U0003,U0004,U0010] |
| P0002 | [U0005,U0008,U0009] |
| P0003 | [U0006,U0011] |

FIG. 10C

| PLACE ID | FOLDER ID |
|---|---|
| P0001 | /P0001/ |
| P0002 | /P0002/ |
| P0003 | /P0003/ |

FIG. 12

| PLACE ID | USER ID | ENTRANCE TIME |
|---|---|---|
| P0001 | U0001 | 2012-4-7T09:58:59 |
| P0002 | U0002 | 2012-4-7T09:58:57 |
| P0003 | U0003 | 2012-4-7T09:50:10 |

METHOD OF CONTROLLING INFORMATION PROCESSING APPARATUS AND INFORMATION PROCESSING APPARATUS

CROSS-REFERENCE TO RELATED APPLICATION

This application is based upon and claims the benefit of priority of the prior Japanese Patent Application No. 2012-120865, filed on May 28, 2012, the entire contents of which are incorporated herein by reference.

FIELD

The embodiment discussed herein is related to a method of controlling an information processing apparatus and an information processing apparatus.

BACKGROUND

Currently, an event such as a meeting, a lecture, a class, or a seminar is held in a meeting room, a classroom, or the like, where people gather. For example, when a meeting is held in a meeting room or the like, the meeting room is reserved in advance using a reservation system or the like, and when a participant has arrived at the meeting room at a reserved time, meeting materials are distributed in the meeting room and the meeting is held for a reserved period of time.

In addition, currently, the use of paper is gradually being reduced in meeting rooms and the like. For example, currently, a system is known in which materials to be used in a meeting are distributed in the form of electronic data using devices such as notebook personal computers (PCs) or tablet terminals, and the meeting is held while participants are displaying the distributed materials on screens of the devices. The electronic data such as meeting materials is stored in a certain file server and managed.

With respect to the management of a meeting room and the management of meeting materials or the like, some methods are known. For example, currently, a method is known in which electronic files to be used in a meeting, personal information regarding participants in the meeting, and the like are transmitted using direct communication between personal handy-phone system (PHS) terminals. In addition, currently, a method is known in which an introduction screen for introducing a plurality of meeting videos is created and displayed, and one in which a user is interested is found among the plurality of meeting videos in a short period of time. In addition, currently, a method is known in which seating and leaving are detected using a seating sensor mounted on each chair and an external apparatus such as lighting is controlled, and a method is known in which participants are registered during reservation for a meeting and meeting materials in a server are transmitted on the basis of identification information issued to those who have been registered (for example, refer to Japanese Laid-open Patent Publication No. 11-46191, Japanese Laid-open Patent Publication No. 2005-352933, Japanese Laid-open Patent Publication No. 2010-236881, and Japanese Laid-open Patent Publication No. 2003-304518).

However, for example, when data files such as meeting materials are managed in a server or the like, since files exist for each event, a lot of files are stored in the server. Therefore, in the methods in the related art, it is difficult to find files to be used among a lot of stored files.

The files in the server may be deleted after a meeting ends, but a creator of the files often forgets to delete the files after the meeting ends, and it is difficult to distinguish the files remaining even after the end of the meeting from files to be used in future meetings.

With respect to the above problem, for example, the files of meeting materials may be deleted upon an end of use time of a meeting room using, for example, time information or the like of a reservation system or the like. However, in the case of an actual meeting, the meeting rarely ends exactly at an end of a reserved period of time; the meeting might continue even after the end of the reserved period of time, or might end at a time earlier than the end of the reserved period of time. Therefore, if the files in the server are deleted using the reserved period of time as a reference, the files of the meeting materials might be deleted even when the meeting is still being held, or might not be deleted even when the meeting has already ended. Therefore, it is desirable to improve the accuracy of estimating an end of an event such as a meeting.

SUMMARY

According to one exemplary embodiment, a method of controlling an information processing apparatus includes obtaining user information related to users of information terminals in a place, and obtaining, by a processor, change information related to a change in the user information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart illustrating an example of a process for estimating an end of a meeting;

FIGS. 10A to 10C are diagrams illustrating examples of data in the present embodiment;

FIG. 12 is a diagram illustrating an example of a user ID list including time information;

DESCRIPTION OF EMBODIMENT

An embodiment will be described in detail hereinafter with reference to the accompanying drawings. It is to be noted that although a meeting is used as an example of an event, examples of the event are not limited to this, and, for example, include situations in which people gather in a certain space for a certain purpose, such as in the cases of a lecture, a class, a seminar, a screening, a play, and a concert.

Example of Schematic Configuration of Meeting End Estimation System

Figure 1:
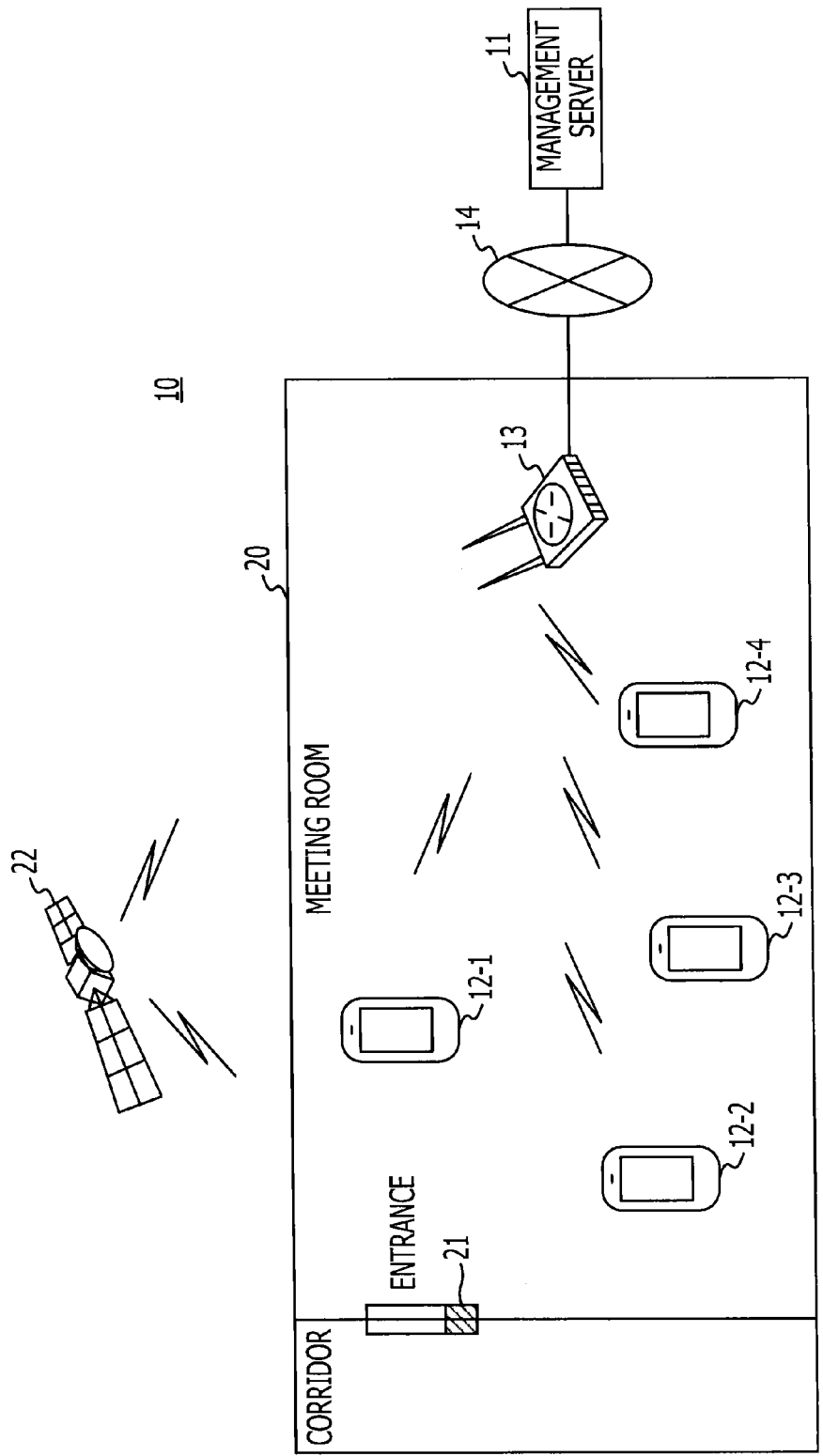
FIG. 1 is a diagram illustrating an example of the schematic configuration of a meeting end estimation system in the present embodiment.

FIG. 1 is a diagram illustrating an example of the schematic configuration of a meeting end estimation system in the present embodiment. A meeting end estimation system 10 illustrated in FIG. 1 includes a management server 11 as an example of an information processing apparatus, one or a plurality of information communication terminals 12, and a relay apparatus 13. The management server 11 and the relay apparatus 13 may be connected to each other by a communication network 14 typified by, for example, the Internet, a local area network (LAN), or the like in such a way as to enable transmission and reception of data. Although the meeting end estimation system 10 illustrated in FIG. 1 includes four information communication terminals 12-1 to 12-4, the number of terminals or the like is not limited to this. In the following description, the information communication terminals 12-1 to 12-4 will be generically referred to as "information communication terminals 12". Furthermore, the management server 11 may manage a plurality of meeting rooms, but, in the following description, details of management of a meeting room 20 will be described for the sake of convenience.

The management server 11 manages, for example, sensing information (for example, user information and positional information (place information)) or the like obtained from the information communication terminals 12 inside the meeting room 20 as illustrated in FIG. 1. The management server 11 may manage the positional information regarding users for each meeting room (certain space). Here, the information communication terminals 12 are, for example, terminals owned by participants (hereinafter also referred to as "users") in a meeting held in the meeting room 20, and the information communication terminals 12 each include a screen for viewing data files such as meeting materials.

Information obtained from each of the information communication terminals 12 is obtained, for example, by the relay apparatus 13 or the like disposed at a certain position (place) in the meeting room 20 regularly or at a certain timing such as when the users enter and leave the meeting room 20, and the obtained information is transmitted to the management server 11 through the communication network 14. The management server 11 estimates an end of a meeting held in the meeting room 20 or the like on the basis of the sensing information or the like obtained from the information communication terminals 12. More specifically, the management server 11 grasps, for example, the number of users, the amount of change, changes in the members, and the like in the meeting room 20 at certain time intervals on the basis of the user information, current place information regarding the users (for example, whereabouts), and the like, and estimates an end of a meeting in accordance with the number, the amount of change, and the like.

Here, the above-mentioned user information is information for identifying the users, and when unique information communication terminals 12 have been provided for the users, identification information regarding the information communication terminals 12 may be used as the user information. In addition, for example, as the above-mentioned positional information, information (for example, Basic Service Set Identifiers (BSSIDs) or radio field intensity) obtained from the relay apparatus 13 that communicates with the information communication terminals 12 may be used, but the positional information is not limited to this. For example, there is a case in which entering and leaving authentication is performed by the users by holding authentication cards or the like owned by the users up to a card reader (information reading apparatus) 21 or the like disposed around an entrance (on a corridor side or on a room side) of the meeting room 20. In such a case, the user information and the positional information may be obtained using the information read by the card reader 21. Furthermore, in the present embodiment, position measurement information regarding the information communication terminals 12 may be obtained by Global Positioning System (GPS) communication using a positioning satellite 22 or the like, and the positional information may be obtained from the obtained position measurement information.

In addition, the management server 11 manages, for example, files such as meeting materials to be distributed to the users who participate in a meeting. More specifically, the management server 11 assigns a data region (for example, a shared folder) that stores the meeting materials to be used in the meeting to the information communication terminals 12 owned by the users who have entered the meeting room 20, and transmits information regarding the assigned data region to the information communication terminals 12. In doing so, the information communication terminals 12 may store the materials to be used in the meeting in the data region and make it possible to view shared files such as the meeting materials stored in the assigned data region. The data region to be assigned may be provided in the management server 11 or may be provided in an external storage device or the like that may transmit and receive data. The shared files may be viewed after downloading the data files themselves stored in the data region to the information communication terminals 12 or may be viewed on the management server 11 without downloading the data files.

In addition, upon estimating that a meeting has ended, the management server 11 deletes, for example, the data region (shared folder) assigned for the meeting and the shared files stored in the data region.

The information communication terminals 12 transmits the above-described sensing information or the like to the management server 11 through the relay apparatus 13 regularly or at a certain timing such as when the users enter and leave the meeting room 20. In doing so, in the present embodiment, the positional information regarding the users who own the information communication terminals 12 may be managed. The information communication terminals 12 are, for example, notebook PCs, mobile terminals, smartphones, tablet terminals, game machines, music recording/playback devices, or the like that are capable of performing wireless or wired communication, but are not limited to these devices.

The relay apparatus 13 is, for example, one of a plurality of communication devices disposed at different positions such as meeting rooms. In the present embodiment, the management server 11 may manage the whereabouts of the information communication terminals 12 on the basis of which relay apparatus (access point) 13 has obtained information from the information communication terminals 12. It is to be noted that the relay apparatus 13 is, for example, a wireless router or the like used for a wireless LAN, but is not limited to this.

By the meeting end estimation system 10, in the present embodiment, for example, an end of a meeting may be properly estimated on the basis of the place information regarding the users or the like and the amount of change and changes in the members of the users in a certain place at certain time intervals or the like, and therefore the accuracy of estimating an end of an event may be improved. In addition, in the present embodiment, by deleting the data region assigned for a meeting or the files in the data region when it has been estimated that a meeting has ended, unnecessary data in the data region may be efficiently deleted.

Management Server 11: Example of Functional Configuration

Figure 2:
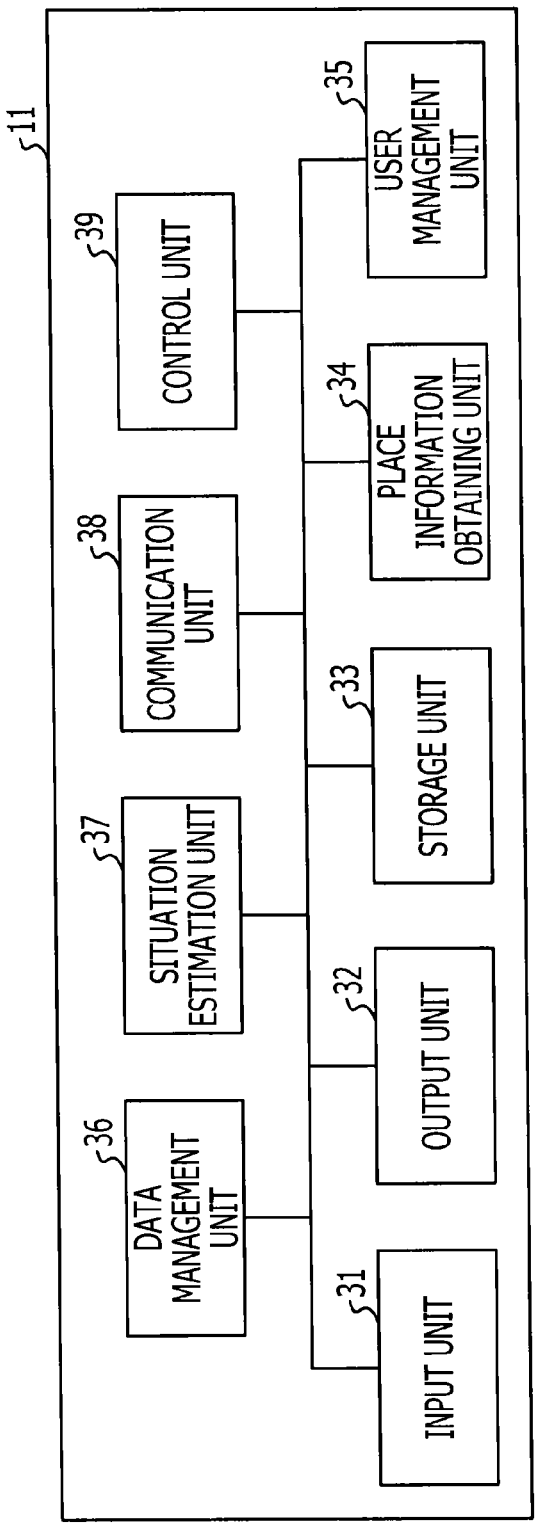
FIG. 2 is a diagram illustrating an example of the functional configuration of a management server.

Next, an example of the functional configuration of the management server 11 will be described with reference to the drawings. FIG. 2 is a diagram illustrating an example of the functional configuration of the management server 11. The management server 11 illustrated in FIG. 2 includes an input unit 31, an output unit 32, a storage unit 33, a place information obtaining unit 34, a user management unit 35, a data management unit 36, a situation estimation unit 37, a communication unit 38, and a control unit 39.

The input unit 31 receives input of beginnings and ends of various instructions relating to a process for estimating an end, various settings, and the like from a manager (user) or the like who is using the management server 11. The input unit 31 includes, for example, a keyboard, a mouse, and the like. Alternatively, the input unit 31 may receive input of sound or the like, and, in this case, includes an audio input unit or the like such as a microphone.

The output unit 32 outputs content input by the input unit 31, content executed on the basis of the input content, and the like. When, for example, the output unit 32 is to output content using screen display, the output unit 32 includes a display unit such as a display, and when the output unit 32 is to output content using sound, the output unit 32 includes an audio output unit or the like such as a speaker.

The storage unit 33 stores various pieces of information used in the present embodiment. More specifically, the storage unit 33 stores the sensing information obtained from the information communication terminals 12, the information regarding a data region (shared folder), a data group (for example, shared files such as meeting materials) stored in the data region, and the like. In addition, the storage unit 33 stores the user information (includes, for example, a current user identification (ID) list, a user ID list when the number of users is maximum, address information when mails are transmitted to the users, or the like) regarding the users who are participating a meeting and the like. In addition, the storage unit 33 stores various pieces of setting information for executing the present embodiment, a result of estimation of an end in the present embodiment, and the like. The storage unit 33 may read the stored various pieces of information at a certain timing and write a result of execution of the process for estimating an end and the like.

The place information obtaining unit 34 obtains, for example, the place information (for example, whereabouts) regarding the users using the information communication terminals 12 regarding the information communication terminals 12 obtained from the relay apparatus 13 or the like. In addition, the place information obtaining unit 34 creates information indicating correspondences between the place information and the user information. The created information indicating the correspondences is stored in the storage unit 33.

The user management unit 35 manages the number of users (for example, the current number, the maximum number, and the like) in the meeting room 20, the amount of change at certain time intervals, changes in the members, and the like regularly or at a certain timing. In addition, management information and the like obtained by the user management unit 35 are stored in the storage unit 33.

The data management unit 36 assigns a data region (for example, a shared folder) or the like that may be used for each meeting room or each meeting, and provides an environment in which the users may view file information stored in the assigned data region. In addition, the data management unit 36 provides positional information regarding the data region for the information communication terminals 12 of the users using electronic mails, a dedicated application, or the like. Thus, the users may access the obtained data region and view meeting materials or the like.

The users may also store (register) the meeting materials or the like in the assigned data region. In this case, the data management unit 36 stores user information regarding a user who has stored the data in the data region. In doing so, in the present embodiment, when, for example, an end of a meeting is estimated, a process for estimating an end in which the user is weighted and distinguished from the other users may be performed. The above-described information regarding the data region for each meeting room, the information regarding the data (files) in the data region, and the like managed by the data management unit 36 are stored in the storage unit 33.

Furthermore, the data management unit 36 deletes the data region assigned for the meeting or the data stored in the data region on the basis of a result of estimation from the situation estimation unit 37.

For example, the situation estimation unit 37 estimates the situation of a meeting or the like on the basis of the sensing information or the like obtained from the information communication terminals 12. More specifically, the situation estimation unit 37 compares, for example, the management information or the like obtained by the user management unit 35 or the like with an end determination condition or the like set in advance, in order to estimate an end of a meeting held in the meeting room 20.

It is to be noted that the estimation of a situation is not limited, for example, to the estimation of an end of a meeting, and an end of an event such as, for example, a lecture, a class, a seminar, a screening, a play, or a concert may be estimated, instead. In addition, the estimation of a situation is not limited to the estimation of an end of one of the above various events, and a beginning of an event may be estimated, instead.

In addition, if the situation estimation unit 37 determines that the meeting has ended, the situation estimation unit 37 causes the data management unit 36 to delete the certain data region (for example, the shared folder) or the data (for example, the shared files) in the data region.

Furthermore, upon obtaining, for example, a pause request signal from a certain information communication terminal 12, the situation estimation unit 37 may temporarily stop the process relating to the estimation of a situation in the present embodiment. The length of time for which the process is stopped may be a predetermined length or a length input by the user or may be a period until a resumption request signal is received from the certain information communication terminals 12, but the length of time is not limited to these.

For example, when the on/off state of lighting in the meeting room 20 has been obtained, the situation estimation unit 37 may realize the estimation of an end more properly by using an off state of the lighting as a condition of the end of a meeting in addition to the above-described estimation of a situation. Information regarding the on/off state of the lighting in the meeting room 20 is, for example, included in the sensing information transmitted from the information communication terminals 12, and, for example, obtained by the place information obtaining unit 34.

The communication unit 38 is a communication interface that may transmit and receive information used in each process executed in the present embodiment, an execution program (for example, an end estimation program) for realizing the process for estimating an end, and the like. In addition, the communication unit 38 may obtain the sensing information regarding the information communication terminals 12 in the meeting room 20 through the communication network 14 and transmit the place information regarding the data region to the information communication terminals 12.

The control unit 39 controls the entirety of the configuration of the management server 11. For example, the control unit 39 controls at least one of processes or the like in the obtaining of the user information, the management of the users, the management of data, the estimation of a situation, the communication, and the like.

Management Server 11: Example of Hardware Configuration

Figure 3:
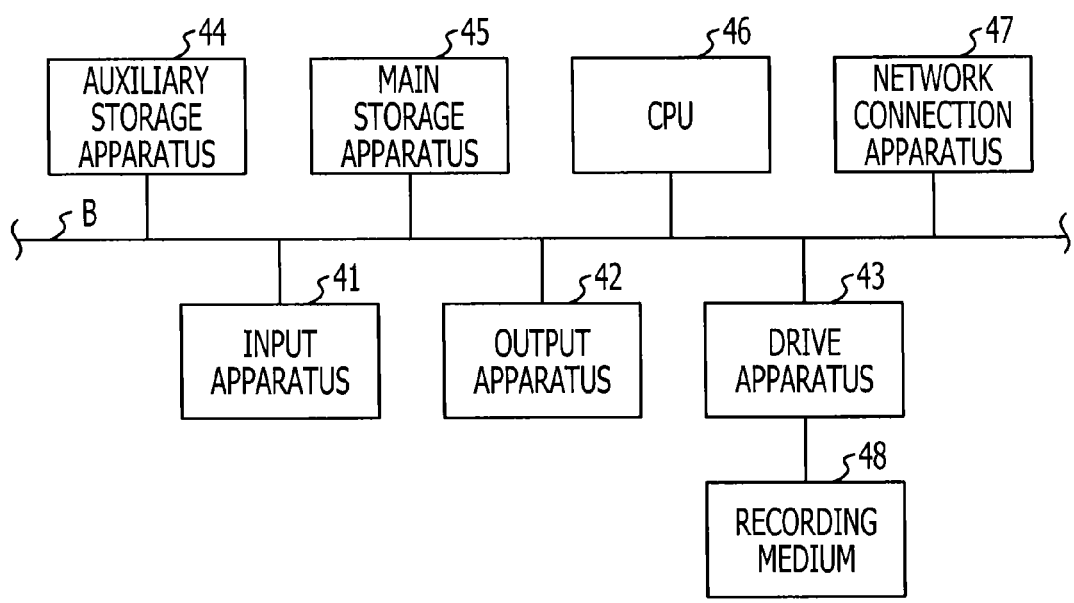
FIG. 3 is a diagram illustrating an example of a hardware configuration.

Next, an example of the hardware configuration of the management server 11 will be described with reference to the drawings. FIG. 3 is a diagram illustrating an example of the hardware configuration. The example of the hardware configuration illustrated in FIG. 3 includes an input apparatus 41, an output apparatus 42, a drive apparatus 43, an auxiliary storage apparatus 44, a main storage apparatus 45, a central processing unit (CPU) 46 that performs various types of control, and a network connection apparatus 47, and these components are connected to one another by a system bus B.

The input apparatus 41 includes, for example, pointing devices such as a keyboard and a mouse operated by the user of the management server 11 or the like, and, for example, receives various operation signals such as execution of a program input by the user (here, the manager).

The output apparatus 42 includes a display that displays various windows, pieces of data, and the like for operating a computer which executes processing in the present embodiment, and displays the progress and results of control programs executed by the CPU 46 and the like.

Here, the execution program (end estimation program) installed in the computer of the management server 11 is provided, for example, by a recording medium 48 or the like. The drive apparatus 43 reads various pieces of data such as the execution program recorded on the recording medium 48. That is, the recording medium 48 may be set in the drive apparatus 43, and the execution program included in the recording medium 48 is installed in the auxiliary storage apparatus 44 from the recording medium 48 through the drive apparatus 43. When the recording medium 48 set in the drive apparatus 43 is writable, for example, the drive apparatus 43 may write data such as a result of execution obtained by executing a program.

The auxiliary storage apparatus 44 is a storage apparatus such as a hard disk drive or a solid-state drive (SSD) that stores the execution program, control programs, and the like in the present embodiment and that inputs and outputs the programs and the like.

The main storage apparatus 45 stores the execution program or the like read from the auxiliary storage apparatus 44 by the CPU 46. The main storage apparatus 45 may be a read-only memory (ROM), a random-access memory (RAM), or the like. CPU 46 is an example of a processor that executes various programs. The processor is an example of a circuitry.

The CPU 46 realizes processing in the estimation of an end by controlling processes of the entirety of the computer, such as various types of calculation and input and output of data from and to each hardware component, on the basis of the control programs of an operating system (OS) and the like and the execution program stored in the main storage apparatus 45. It is to be noted that various pieces of information used while a program is being executed may be obtained from the auxiliary storage apparatus 44, and the auxiliary storage apparatus 44 may store a result of execution and the like.

The network connection apparatus 47 is a communication interface that enables communication of data when the network connection apparatus 47 is connected to an external apparatus or the like through the communication network 14 or the like. In addition, when connected to an external apparatus or the like, the network connection apparatus 47 may obtain the execution program and provide a result of execution obtained by executing a program or the execution program itself corresponding to the present embodiment for the external apparatus or the like.

The recording medium 48 is, as described above, a computer-readable recording medium that stores the execution program and the like. The recording medium 48 may be, for example, a portable recording medium such as a universal serial bus (USB) memory, a compact disc read-only memory (CD-ROM), or a digital versatile disc (DVD), or may be a semiconductor memory such as a flash memory.

Schematic Example of Process for Estimating End

Figure 4:
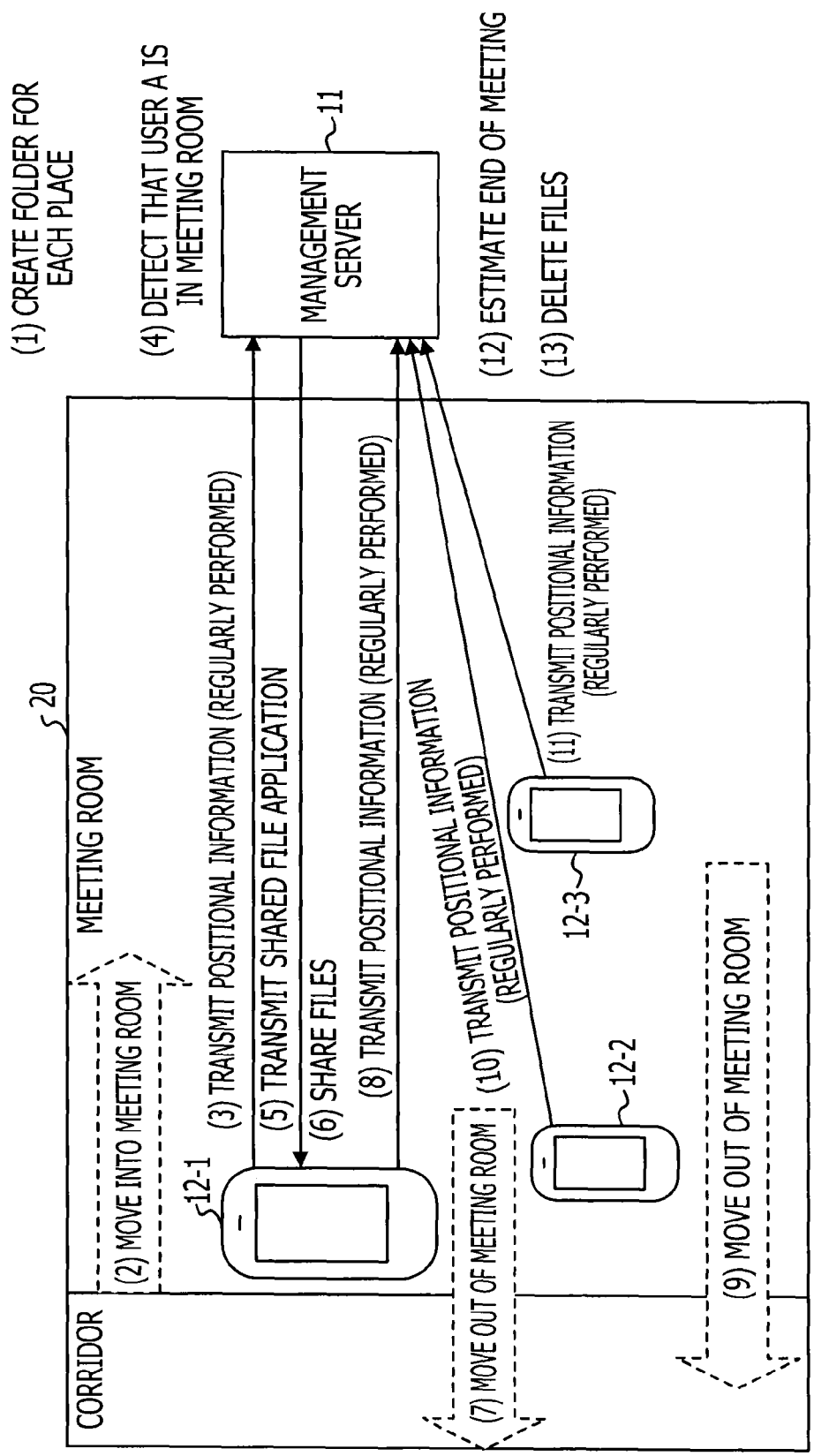
FIG. 4 is a diagram illustrating a schematic example of a process for estimating an end of a meeting.

Next, a schematic example of the process for estimating an end in the present embodiment will be described with reference to the drawings. In the following description, for example, an example in which an end of a meeting is estimated will be described. FIG. 4 is a diagram illustrating a schematic example of the process for estimating an end.

In the example illustrated in FIG. 4, a process is performed, using steps indicated by (1) to (13), in which the management server 11 estimates an end of a meeting on the basis of the sensing information or the like obtained from the information communication terminals 12, and deletes data (for example, shared files) used in the meeting.

More specifically, in the example illustrated in FIG. 4, first, a data region (for example, a folder) is created for place information (for example, a meeting room or the like) in advance ((1) illustrated in FIG. 4). When a user (referred to as a user A here) who owns the information communication terminal 12-1 has moved from the corridor into the meeting room 20 ((2) illustrated in FIG. 4), positional information regarding the information communication terminal 12-1 is transmitted to the management server 11 through the relay apparatus 13 or the like ((3) illustrated in FIG. 4). It is to be noted that a process for transmitting positional information is performed, for example, regularly. Thus, the management server 11 may detect that the user A, who owns the information communication terminal 12-1, is in the corresponding place (the meeting room 20) from the transmitted positional information and the positional information regarding the relay apparatus 13 ((4) illustrated in FIG. 4).

Next, the management server 11 transmits an application (for example, a shared file application) for viewing, on the information communication terminal 12-1, files stored in the folder corresponding to the meeting room 20 created in (1) illustrated in FIG. 4 to the information communication terminal 12-1 ((5) illustrated in FIG. 4). The information communication terminal 12-1 may share and view these files from the position of the folder created using the shared file application ((6) illustrated in FIG. 4).

In addition, in the example illustrated in FIG. 4, when the meeting or the like has ended and the user A, who owns the information communication terminal 12-1, has moved out of the meeting room 20 ((7) illustrated in FIG. 4), the positional information regarding the information communication terminal 12-1 is transmitted to the management server 11 ((8) illustrated in FIG. 4). It is to be noted that the above-described processing in (3) to (8) illustrated in FIG. 4 is also performed by the information communication terminals 12-2 and 12-3 illustrated in FIG. 4. Therefore, when the information communication terminals 12-2 has moved out of the meeting room 20 ((9) illustrated in FIG. 4), positional information after the movement is transmitted to the management server 11 ((10) illustrated in FIG. 4). At the same time, the information communication terminal 12-3 is in the meeting room 20, and positional information regarding the information communication terminal 12-3 is transmitted to the management server 11 ((11) illustrated in FIG. 4).

The management server 11 estimates the end of the meeting held in the meeting room 20 on the basis of the positional information obtained from the information communication terminals 12-1 to 12-3 illustrated in FIG. 4 ((12) illustrated in FIG. 4). In addition, if it is estimated that the meeting has ended, for example, the management server 11 deletes the files in the folder created in the above-described (1) illustrated in FIG. 4 ((13) illustrated in FIG. 4).

Thus, in the present embodiment, a method for accessing a shared folder for a certain meeting room may be transmitted to an information communication terminal 12 that has entered the certain room and an end of a meeting may be estimated on the basis of information (for example, entering and leaving of a user who is in the certain meeting room) relating to the certain meeting room.

It is to be noted that, in the estimation of an end of a meeting, it is estimated that the meeting has been ended when, for example, the maximum number of users in the meeting room 20 has obtained and then the number of users has become equal to or smaller than a certain percentage (for example, 50%) relative to the maximum number of users after it is estimated that a previous meeting has ended in the same meeting room (for example, the meeting room 20). In addition, in the present embodiment, for example, an end of a meeting may be estimated on the basis of the amount of change in the number of users at certain time intervals (for example, 5 minutes). It is to be noted that the amount of change in the number of users is, for example, information regarding a difference between the number of users obtained at a previous time and the number of users obtained at this time. The information regarding the difference may be a certain amount of decrease in percentage (for example, −50%), or may be a certain amount of decrease in the number of users (for example −30 users). In addition, in the present embodiment, an end of a meeting may be estimated on the basis of the number of authentication cards read by the card reader 21 when users leave the meeting room 20 or the amount of change (for example, the amount of increase) at the certain time intervals.

In addition, in the present embodiment, when it has been estimated that a meeting has ended, a data region (for example, a shared folder) assigned for the meeting, shared files in the shared folder, or the like may be deleted.

Specific Procedure of Process

Next, a specific example of the process for estimating an end will be described. In the following description, processing by an information communication terminal 12 owned by a user and processing by the management server 11 will be specifically described.

Figure 5:
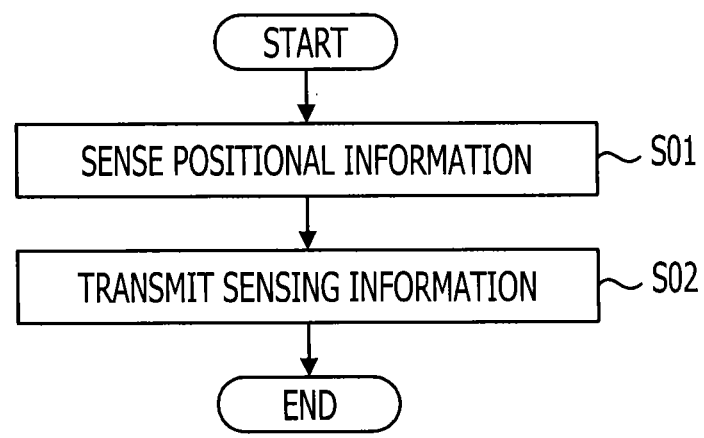
FIG. 5 is a flowchart illustrating an example of a process for transmitting positional information executed by an information communication terminal.

FIG. 5 is a flowchart illustrating an example of a process for transmitting positional information executed by the information communication terminal 12. In the transmission process illustrated in FIG. 5, the information communication terminal 12 senses the positional information or the like (S01), and transmits sensing information obtained by the processing in S01 to the management server 11 through the relay apparatus 13 or the like (S02).

It is to be noted that, in the processing in S01, for example, the position measurement information or the like available by the GPS communication or the like may be sensed, but the GPS communication or the like might not be obtained in an indoor environment such as in a meeting room. Therefore, in an indoor environment, for example, the positional information or the like is sensed using the radio field intensity of Wi-Fi (registered trademark) or Bluetooth (registered trademark). For example, when the radio field intensity of Wi-Fi is used, Wi-Fi scanning is regularly performed. In addition, in the present embodiment, as a result of the scanning, a BSSID and the radio field intensity of an access point (the relay apparatus 13) of Wi-Fi around the information communication terminal 12 are obtained as the positional information. As sensing data, for example, the BSSID, the radio field intensity, or the like may be used, but the sensing data is not limited to one of these, and, for example, an Extended Service Set Identifier (ESSID) or the like may be used, instead.

In the scanning, a relay apparatus 13 that transmits a radio beacon having the strongest intensity may be selected from among a plurality of relay apparatuses (access points) 13 provided at different positions by comparing the reception intensity of their respective radio beacons. In addition, in the present embodiment, the position of the information communication terminals 12 may be measured more accurately by, for example, performing trilateration using information from the plurality of relay apparatuses 13. Furthermore, in the processing in S01, for example, the positional information from the card reader 21 may be used. Furthermore, in the processing in S01, for example, pieces of sensing information obtained by an acceleration sensor, a gyro sensor, and the like provided in the information communication terminal 12 may be combined with one another in order to improve the accuracy of the sensing of the positional information.

In the processing in S02, both the sensing information obtained by the processing in S01 and user information (for example, identification information such as a user identifier (ID) or a terminal ID) are transmitted to the management server 11.

Figure 6:
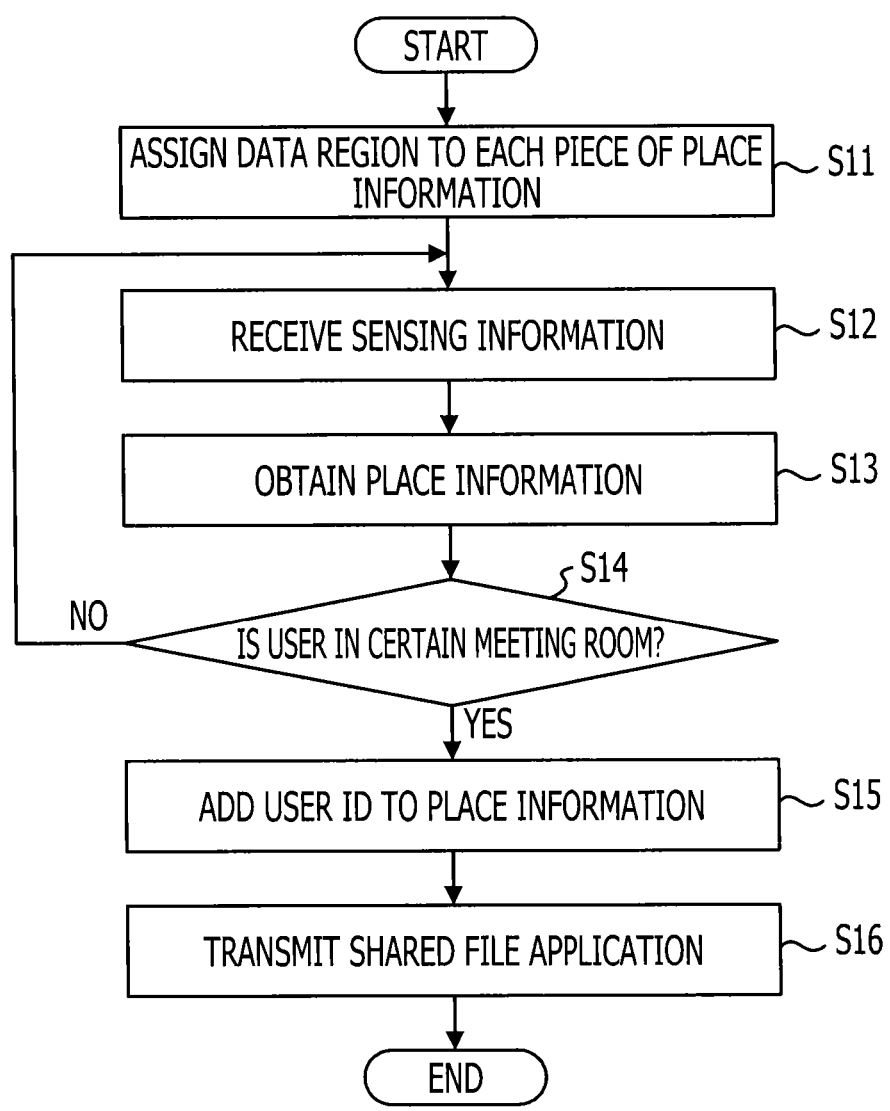
FIG. 6 is a flowchart illustrating an example of a process for transmitting information regarding shared files executed by the management server.

FIG. 6 is a flowchart illustrating an example of a process for transmitting information regarding shared files executed by the management server 11. Here, the shared files include the above-described data such as meeting materials stored in the data region assigned for each meeting room, but are not limited to this.

In the process for transmitting information regarding shared files, a data region that stores shared files or the like is assigned for each piece of place information (positional information) (S11). It is to be noted that, in the processing in S11, the data region may be assigned to the storage unit 33 in the management server 11, or, for example, may be assigned to an external apparatus such as a data center. Next, in the process for transmitting information regarding shared files, when sensing information has been received from the information communication terminal 12 (S12), place information regarding the whereabouts of a user is obtained from the sensing information (S13).

Next, in the process for transmitting information regarding shared files, whether or not the user is in a certain meeting room (place) is determined on the basis of the place information obtained by the processing in S13 (S14), and if the user is not in the certain meeting room (NO in S14), the process returns to S12 and waits until next sensing information is received. It is to be noted that a case in which the user is not in the certain meeting room is, for example, when the user is in a place that is not managed by the management server 11 (for example, at his/her own desk or in a corridor).

On the other hand, in the process for transmitting information regarding shared files, if the user is in the certain meeting room (YES in S14), a user ID is added to the place information in order to count the number of users in each place (S15). It is to be noted that, in the processing in S15, time information regarding a time when the user has entered the place may be added. In the present embodiment, by performing the processing in S15 for each user (information communication terminal 12), a user ID list, which will be described later, is created.

In addition, in the process for transmitting information regarding shared files, a certain application (shared file application) for viewing the shared files is transmitted to the information communication terminal 12 used by the user (S16). It is to be noted that, in the processing in S16, the shared files themselves may be transmitted to the information communication terminal 12.

Here, information regarding a data region (for example, a shared folder) corresponding to the place information has been added to the shared file application, and accordingly the user may easily access the provided shared folder.

Figure 7:
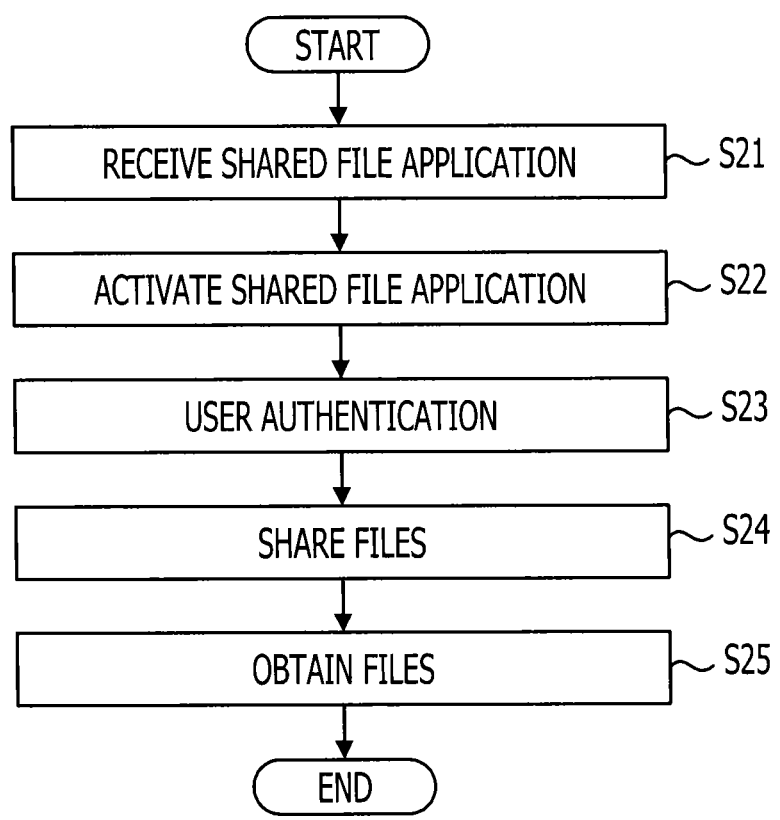
FIG. 7 is a flowchart illustrating an example of a process for obtaining a file executed by the information communication terminal.

FIG. 7 is a flowchart illustrating an example of a process for obtaining a file executed by the information communication terminal 12. In the process for obtaining a file illustrated in FIG. 7, when the shared file application obtained by the management server 11 has been received (S21), the received shared file application is activated (S22), and user authentication for accessing the management server 11 is performed (S23). When the processing in S23 has been performed, illegal access or the like by a third party who is not a participant in the meeting may be suppressed, but the user authentication may be omitted.

Next, in the process for obtaining a file, when the authentication in S23 has been successfully completed, the files stored in the data region (for example, the shared folder) set for each piece of the place information set in the shared file application are shared (S24), and a plurality of users become able to obtain the files (S25). It is to be noted that when the files are to be obtained, the files may be obtained by downloading, or the files stored in the management server 11 or the like may be just viewed. In addition, although an example in which the files that are already stored in the certain shared folders are obtained is described in the processing in S25, the processing is not limited to this, and, for example, a file may be stored, instead.

As described above, in the present embodiment, after the user authentication is performed using the shared file application, files in the information communication terminals 12 may be copied to a shared folder and files in a shared folder may be accessed and displayed on the screens of the information communication terminals 12. Thus, after entering a meeting room, the users may easily access a shared folder for the meeting room and easily share files with the others in the same meeting room.

Figure 8:
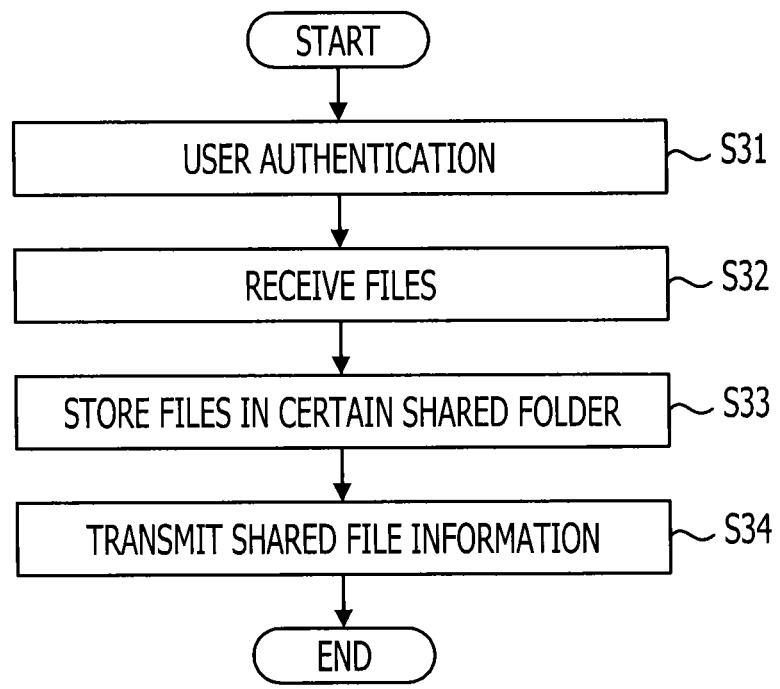
FIG. 8 is a flowchart illustrating an example of a process for storing a file executed by the management server.

FIG. 8 is a flowchart illustrating an example of a process for storing a file executed by the management server 11. In the process for storing a file illustrated in FIG. 8, user authentication is performed on the information communication terminal 12 of a user (for example, a host, a presenter, or a chairperson of a meeting or the like) who is to store files such as meeting materials (S31). By performing the processing in S31, illegal access may be suppressed and place information regarding the user may be obtained from a user ID or the like used for the authentication.

In addition, in the process for storing a file, when a result of the authentication has been satisfactory, the files are received from the information communication terminal 12 (S32), and the received files are stored in a certain shared folder corresponding to the place information (S33). In addition, in the process for storing a file, shared file information indicating that the files have been stored in the shared folder is transmitted to the information communication terminal 12 (S34).

FIG. 9 is a flowchart illustrating an example of the process for estimating an end of a meeting. In the process for estimating an end of a meeting illustrated in FIG. 9, first, place information is obtained (S41), and a user ID list when the number of users is maximum is obtained (S42). It is to be noted that, in the processing in S42, for example, a user ID list for managing user information (for example, user IDs) for each place is obtained at certain time intervals, and the current number of users, the maximum number of users, and the like in the same place are obtained by managing the user ID list.

Next, in the process for estimating an end of a meeting, the current number of users (the number of users remaining in the meeting room (the number of remaining users)) is obtained (S43), and whether or not the current number of users is smaller than or equal to a certain percentage (for example, 40%) relative to the maximum number of users is determined (S44). Here, in the process for estimating an end of a meeting, if the current number of users is not smaller than or equal to the certain percentage (NO in S44), a previous user ID list is obtained (S45), and the current number of users is calculated (S46). Next, in the process for estimating an end of a meeting, whether or not the current number of users is smaller than or equal to the certain percentage relative to the number of users a certain time (for example, 5 minutes) ago is determined (S47).

Here, in the process for estimating an end of a meeting, in the processing in S44, if the current number of users is smaller than or equal to the certain percentage relative to the maximum number of users (YES in S44), it is estimated that the meeting has ended (S48). In addition, in the process for estimating an end of a meeting, in the processing in S47, if the current number of users is smaller than or equal to the certain percentage relative to the number of users the certain time ago (YES in S47), it is estimated that the meeting has ended (S48). In addition, in the process for estimating an end of a meeting, when it has been estimated that the meeting has ended, a shared folder or shared files assigned for the place information (for example, the meeting room) is deleted (S49).

In addition, in the process for estimating an end of a meeting, if the current number of users is not smaller than or equal to the certain percentage relative to the number of users the certain time ago (NO in S47), whether or not the current number of users is the maximum number of users is determined (S50). The processing in S50 may be performed by comparing information regarding the maximum number of users obtained from a user ID list at a time when the number of users is maximum so far with the current number of users obtained by the processing in S46. In the process for estimating an end of a meeting, if the current number of users is the maximum number of users (YES in S50), a current user ID list is stored as a user ID list at a time when the number of users is maximum (S51). On the other hand, in the process for estimating an end of a meeting, if the current number of users is not the maximum number of users (NO in S50), the current user ID list is stored as a previous user ID list (S52).

It is to be noted that although the process illustrated in FIG. 9 may be repeated at certain time intervals, but the process is not limited to this, and, for example, the process may be performed using a change in the place information as a trigger, instead.

Examples of Data

Next, examples of data in the present embodiment will be described with reference to the drawings. FIGS. 10A to 10C are diagrams illustrating examples of data in the present embodiment. FIG. 10A illustrates an example of place definition information, FIG. 10B illustrates an example of the user ID list, and FIG. 10C illustrates an example of a correspondence table of place information and data regions.

Items of the place definition information illustrated in FIG. 10A include, for example, a place ID, a BSSID, and radio field intensity (-dB), but the items are not limited to these. The place ID is, for example, identification information assigned to the relay apparatus (access point) 13 or the like. In addition, in FIG. 10A, a BSSID and minimum radio field intensity (a reference value) for each place ID are stored in advance. Therefore, in the present embodiment, by comparing a BSSID and radio field intensity included in the sensing information obtained from the information communication terminal 12 of a user with the place definition information illustrated in FIG. 10A, a corresponding place ID (positional information) may be obtained.

It is to be noted that a value of the radio field intensity obtained from the information communication terminal 12 and values of the radio field intensity illustrated in FIG. 10A may not match, and, for example, the radio field intensity of a place ID "p0001" illustrated in FIG. 10A may be set to 40 to 60. Thus, in the present embodiment, place information regarding the whereabouts of a user may be obtained from sensing information regarding the user. It is to be noted that a method for obtaining place information regarding the whereabouts of a user is not limited to this.

Items of the user ID list illustrated in FIG. 10B include, for example, a place ID and user information, but the items are not limited to these. In the user information, a current (present) user ID or a terminal ID of an information communication terminal 12 is stored. For example, in the example illustrated in FIG. 10B, users who are currently in the place ID "p0001 " are [u0001, u0002, u0003, u0004, u0010], from which it may be seen that the number of users is 5.

It is to be noted that the user ID list when the number of users is maximum is, for example, user information that is stored when the number of users obtained at certain time intervals is the maximum number of users. A determination as to whether or not the number of users is maximum is made by comparing the number of users in the same place obtained regularly at the certain time intervals with a previous number of users in the same place, and if the number of users is larger than the previous number of users, the number of users and user information are stored as the user ID list at a time when the number of users is maximum. In the present embodiment, by including the correspondence table illustrated in FIG. 10C or the like, the number of users corresponding to place information, changes in the members, and the like may be accurately managed.

In addition, items of the correspondence table of place information and data regions include, for example, a place ID and a folder ID, but the items are not limited to these. In the present embodiment, by setting a folder ID as a data region that stores shared files for each place ID, meeting materials or the like used in a meeting in a meeting room may be stored, and the meeting materials stored in the data region may be shared between users.

Here, for example, in the processing in S44 in the process for estimating an end of a meeting illustrated in FIG. 9, when the maximum number of users and the current number of users are compared, user IDs included in the user ID list at a time when the number of users is maximum and user IDs obtained from the place information by referring to FIG. 10B may be compared in order to obtain the number of users (the current number of users) having user IDs that are found in both the user ID lists. This is because there is a case in which although a meeting has actually ended and users (participants) in a next meeting have entered a meeting room, it is not estimated that the meeting has ended because there is no difference in the number of users itself. In the present embodiment, by performing the above-described process, even if users have been replaced by other users with respect to a certain piece of place information, an end of a meeting may be estimated more properly, thereby improving the accuracy of estimating an end of an event.

Now, a specific example in which the processing in S44 is performed on the basis of the number of user IDs found in both the user ID lists will be described. In the following description, the user ID list when the number of users is maximum is assumed to be [u0001, u0002, u0003, u0004, u0010], and the user ID list for a certain piece of place information (the place ID "p0001") is assumed to be [u0001, u0002, u0020]. In addition, the certain percentage is assumed to be 40% or less. In this case, since users found in both the user ID lists are u0001 and u0002, the current number of users is 2. Therefore, since two of the five users included in the user ID list when the number of users is maximum are remaining, the current number of users is smaller than or equal to the certain percentage (40%). Accordingly, in this case, it may be estimated that the meeting has ended.

Between meetings, not all users might not leave a meeting room and remain for a while, users who participate in a next meeting might have entered the meeting room, or users who participate in both the meetings might be in the meeting room. However, even in these cases, the end of the meeting may be properly estimated. In addition, the processing in S44 may also be applied to the comparison of the number of users the certain time ago with the current number of users in S47.

Filtering of Users in User ID List

In the present embodiment, when a user ID list is stored in the process for estimating an end of a meeting, user information corresponding to place information may be stored as the user ID list on the basis of the sensing information from the information communication terminals 12. In addition, in the present embodiment, for example, by filtering users included in a user ID list using certain conditions, an end of a meeting may be estimated more properly and the accuracy of estimating an end of an event may be improved. It is to be noted that, in the filtering of users using the certain conditions, for example, the filtering may be limited to users who have copied shared files to a shared folder or to users who have been in a certain place for a certain time or more, but the filtering is not limited to these.

Figure 11A:
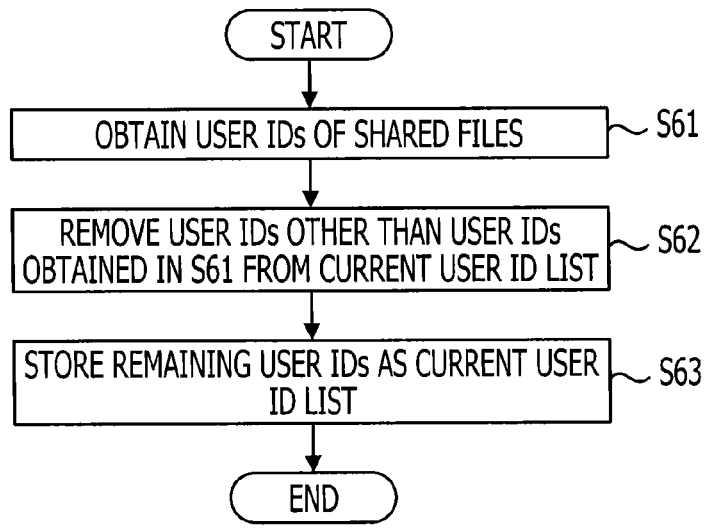
FIGS. 11A and 11B are flowcharts illustrating specific examples of a process for creating a user ID list.
Figure 11B:
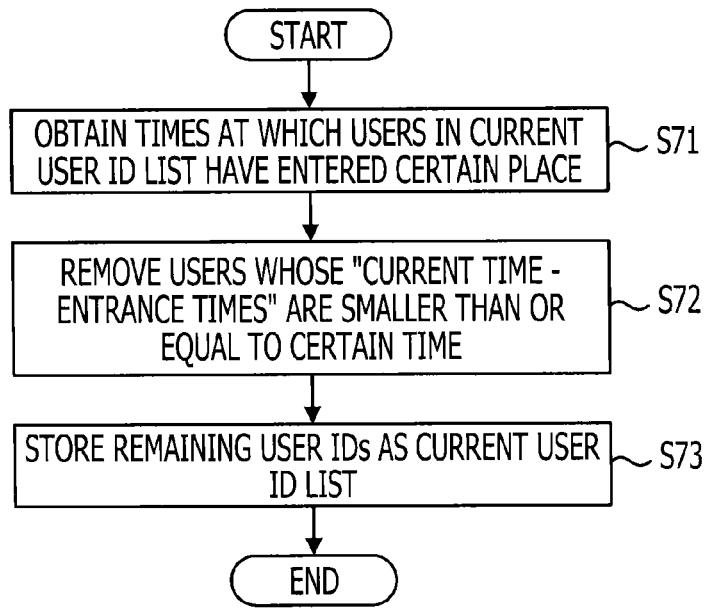

FIGS. 11A and 11B are flowcharts illustrating specific examples of a process for creating a user ID list. FIG. 11A illustrates an example of a process for creating a user ID list (hereinafter referred to as a "first creation process") limited to users who have copied shared files to a shared folder. FIG. 11B illustrates an example of a process for creating a user ID list (hereinafter referred to as a "second creation process") limited to users who have been in a certain place for a certain time or more.

In the first creation process illustrated in FIG. 11A, user IDs of shared files that are already stored in a shared folder or the like are obtained (S61). Next, in the first creation process, filtering is performed on user IDs included in a current user ID list using the user IDs obtained by the processing in S61, and user IDs other than the user IDs obtained by the processing in S61 are removed (S62). Next, in the first creation process, remaining user IDs are stored as a current user ID list (S63).

That is, providers of shared files or the like often play important roles as, for example, presenters in a meeting, and therefore such important users are weighted, that is, for example, a user ID list that includes only the important users is created, and an end of a meeting is estimated using the created user ID list. Thus, in the present embodiment, by determining an end of a meeting on the basis of leaving of the important users or the like, the accuracy of estimating the end of the meeting may be improved.

In addition, in the second creation process illustrated in FIG. 11B, for example, times at which users included in a current user ID list have entered a certain place (for example, a meeting room) are obtained (S71). Next, in the second creation process, users whose entrance times are different from the current time (current time−entrance time) by a certain time (for example, 5 minutes) or less are removed (S72). Next, in the second creation process, remaining user IDs are stored as a current user ID list (S73).

In order to realize the second creation process illustrated in FIG. 11B, time information is stored in a user ID list. FIG. 12 is a diagram illustrating an example of a user ID list including time information. In the example illustrated in FIG. 12, for example, a place ID, a user ID, and an entrance time are included as items, but the items are not limited to these. In the example illustrated in FIG. 12, information regarding times at which users who have entered a certain place (for example, a meeting room) have entered the certain place is stored. More specifically, in the example illustrated in FIG. 12, for example, it is indicated that a user (a user ID "u0001") who is in a place ID "p0001" has entered the place at 9:58:59 on Apr. 7, 2012.

It is to be noted that the time information may be added when the sensing information or the like is transmitted from the information communication terminal 12, or may be a time at which the management server 11 has obtained information from the information communication terminal 12 or the management server 11 has obtained information indicating that a user has entered a place.

Thus, in the present embodiment, for example, a user ID list when the number of users is maximum and a previous user ID list may be created using users who have entered a place and stayed there for a certain time (for example, 3 minutes) or more as targets, and then estimation of an end of a meeting or the like may be performed. Therefore, in the present embodiment, for example, a person who is not a participant of a meeting, that is, a person who has brought some tools to the meeting, who has entered a place on urgent business, who has entered the place by mistake and immediately left the place, or the like may be removed from the process for estimating an end of a meeting. Accordingly, in the present embodiment, by performing the above-described process, the accuracy of estimating an end of a meeting may be improved.

Estimation of End of Meeting when Break is Included

In a meeting or the like that lasts a long time, a break might be provided during the meeting, and it is likely that a lot of users (participants) temporarily leave a meeting room during the break. In the present embodiment, in order not to estimate an end of a meeting because of the leaving during the break, a request to temporarily stop the process for estimating an end of a meeting is transmitted from a predetermined information communication terminal 12 of a particular user or the like such as a manager, and the transmitted temporary stop request is received by the management server 11 to stop the process.

In this case, for example, the temporary stop request may be transmitted using a shared file application or the like activated in the information communication terminal 12. In another case, a temporary stop request mail may be transmitted to a certain address of the management server 11. It is to be noted that when the temporary stop request is transmitted from a certain information communication terminal 12 to the management server 11, time information regarding a stop time, a resumption time, and the like may also be included.

After the temporary stop request is received, the management server 11 stops the process for estimating an end of a meeting until a certain period of time has elapsed from the reception time of the temporary stop request or until a specified resumption time has come. In addition, after the lapse of the certain period of time, the management server 11 resumes the process.

Here, the temporary stop request includes, for example, information such as "<xml><command action="pause" duration="1800"/></xml>". This temporary stop request includes time information indicating that the process is stopped for 1,800 seconds in addition to a command instruction of a temporary stop. It is to be noted that information regarding the temporary stop request in the present embodiment is not limited to the above-described Extensible Markup Language (XML) format, and another data format may be used, instead. In addition, in the present embodiment, a request to cancel the temporary stop may be transmitted, and therefore, for example, after a 60-minute temporary stop is requested, it may be corrected to a 30-minute temporary stop. In addition, in the present embodiment, after the temporary stop request is transmitted, a resumption request may be transmitted from a certain information communication terminal 12 to the management server 11 at a timing at which a meeting is to be resumed, and the process for estimating an end of a meeting may be resumed at a time at which the management server 11 has received the resumption request.

Figure 13:
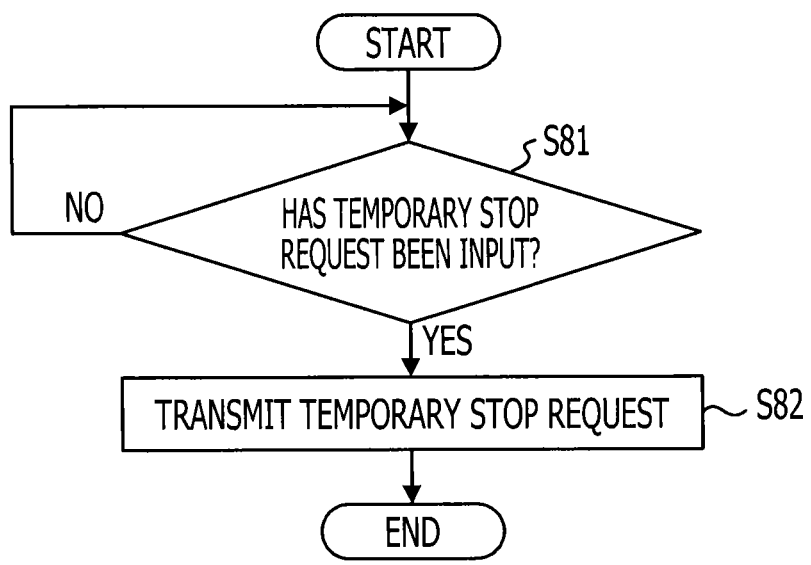
FIG. 13 is a flowchart illustrating an example of a process for requesting a temporary stop executed by the information communication terminal.

FIG. 13 is a flowchart illustrating an example of a process for requesting a temporary stop executed by the information communication terminal 12. In the process for requesting a temporary stop illustrated in FIG. 13, for example, whether or not a temporary stop request has been input is determined (S81), and if the temporary stop request has been input (YES in S81), the temporary stop request is transmitted to the management server 11 (S82). It is to be noted that information regarding the temporary stop request to be transmitted may include time information regarding a stop time and a resumption time. In addition, in the process for requesting a temporary stop, if the temporary stop request has not been input (NO in S81), the process returns to the processing in S81.

Figure 14:
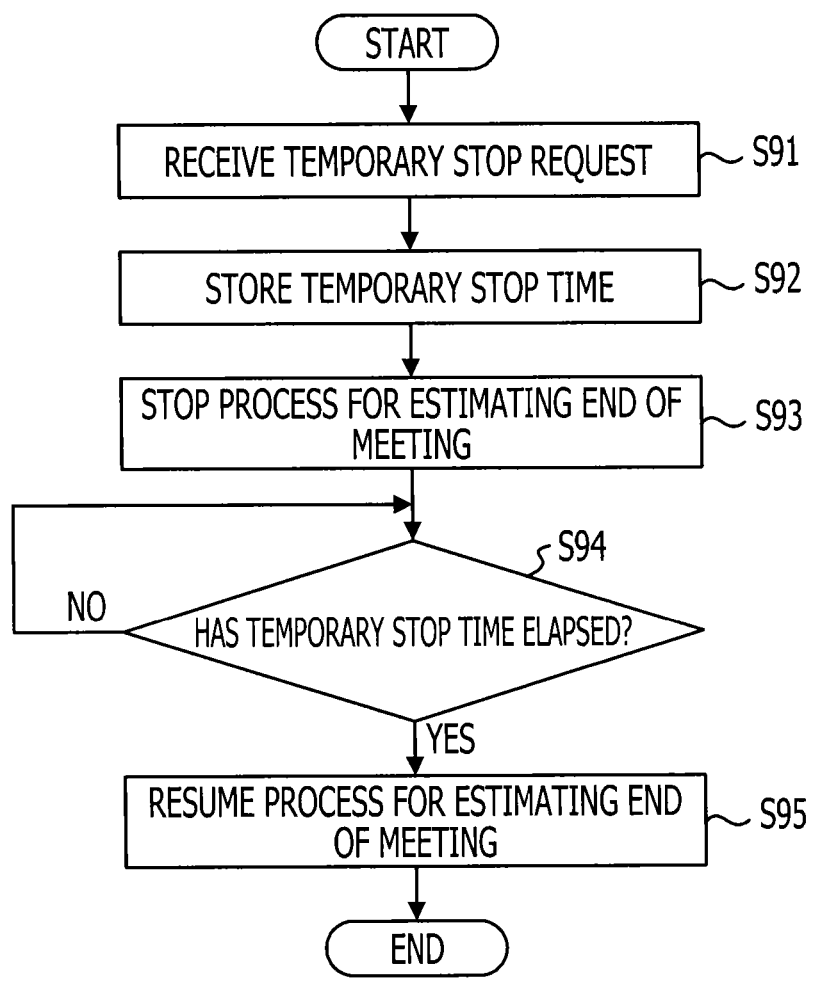
FIG. 14 is a flowchart illustrating an example of a temporary stop process executed by the management server.

FIG. 14 is a flowchart illustrating an example of a temporary stop process executed by the management server 11. In the temporary stop process illustrated in FIG. 14, upon receiving the temporary stop request (S91), for example, the management server 11 stores a temporary stop time included in the temporary stop request or a predetermined temporary stop time in the storage unit 33 or the like (S92). Next, in the temporary stop process, for example, the process for estimating an end of a meeting in the present embodiment illustrated in FIG. 9 is stopped (S93). In the processing in S93, various pieces of information such as a user ID list are maintained, so that the process may be resumed after the lapse of the temporary stop time.

In the temporary stop process, time is counted after the temporary stop request is received, and whether or not the counted time has exceeded the temporary stop time is determined (S94). In the temporary stop process, if the counted time has not exceeded the temporary stop time (NO in S94), the process waits until the temporary stop time elapses. On the other hand, in the temporary stop process, if the counted time has exceeded the temporary stop time (YES in S94), the process for estimating an end of a meeting stopped in S93 is resumed. The above-described temporary stop process executed by the management server 11 is, for example, executed by the situation estimation unit 37 or the like.

Although the process is resumed after the lapse of the temporary stop time in the example illustrated in FIG. 14, the process is not limited to this. For example, as another example, the process may be resumed after the lapse of the resumption time specified by the certain information communication terminal 12, or may be resumed on the basis of the resumption request from the certain information communication terminal 12.

In addition, in the present embodiment, it is possible that only the information communication terminal 12 of a predetermined user may transmit the process for requesting a temporary stop illustrated in FIG. 13. In addition, in the present embodiment, in the temporary stop process illustrated in FIG. 14, it is possible that if the temporary stop request received by the management server 11 is not a request from the predetermined user, the process for estimating an end of a meeting is not stopped. Thus, for example, only the temporary stop request from an important user such as a host of a meeting or the like may be accepted.

According to the above-described embodiment, the accuracy of estimating an end of an event such as a meeting may be improved. In addition, in the present embodiment, when it has been estimated that an event such as a meeting has ended, a certain data region (shared folder) assigned in order to store shared files such as meeting materials or the shared files may be deleted. Therefore, in the present embodiment, file sharing may be easily realized for a meeting, and even if a user has forgotten to delete the files after the meeting ends, the system may automatically delete the files. Therefore, in the present embodiment, it may be avoided that the number of files becomes large due to unnecessary files or the like and it becomes difficult to find a desired file, that a storage capacity becomes saturated, and that meeting materials that remain stored after a meeting ends leak due to illegal access. In addition, in the present embodiment, an end of a meeting or the like may be properly estimated without presetting participants, start and end times, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of controlling an information processing apparatus, the method comprising:
obtaining, by a processor, at two or more time points, sensing information transmitted from respective information terminals, the sensing information including a user identifier and place information, the user identifier identifying a user of each of the information terminals, the place information indicating a place at which each of the information terminals resides;
assigning a first data region to a first event held in a first place;
managing participant information including user identifiers that identify users of information terminals residing in the first place on a basis of the obtained sensing information;
assigning weighted values for the users of information terminals, wherein users of the information terminals who have stored first data in the first data region are assigned different weighted values compared to other users; and
determining whether the first event is ended on a basis of the weighted values.

2. The method according to claim 1, further comprising:
deleting the first data when the first event is determined to be ended.

3. The method according to claim 1, further comprising:
stopping the determining for a predetermined time period in response to a request received from a predetermined information terminal among the information terminals.

4. The method according to claim 1, further comprising:
calculating a parameter representing a change in the participant information with time, wherein the parameter is a difference between a first number of user identifiers included in current participant information and a second number of user identifiers included in previous participant information.

5. The method according to claim 1, further comprising:
calculating a parameter representing a change in the participant information with time, wherein the parameter is a ratio of a current number of user identifiers included in current participant information to a maximum number of user identifiers included in previous participant information.

6. The method according to claim 1, further comprising:
calculating a parameter representing a change in the participant information with time, wherein the change in the participant information is calculated only for information terminals that have stayed in the first place for a predetermined period of time or more.

7. A non-transitory computer-readable recording medium that stores a control program for causing a computer to execute a process, the process comprising:
obtaining, at two or o e time points, sensing information transmitted from respective information terminals, the sensing information including a user identifier and place information, the user identifier identifying a user of each of the information terminals, the place information indicating a place at which each of the information terminals resides;
assigning a first data region to a first event held in a first place;

managing participant information including user identifiers that identify users of information terminals residing in the first place on a basis of the obtained sensing information;

assigning weighted values for the users of information terminals, wherein users of the information terminals who have stored first data in the first data region are assigned different weighted values compared to other users; and determining whether the first event is ended on a basis of the weighted values.

8. The medium according to claim 7, wherein the process further comprises:

deleting the first data when the first event is determined to be ended.

9. The medium according to claim 7, wherein the process further includes calculating a parameter representing a change in the participant information with time, and the parameter is a difference between a first number of user identifiers included in current participant information and a second number of user identifiers included in previous participant information.

10. The medium according to claim 7, wherein the process further includes calculating a parameter representing a change in the participant information with time, and the parameter is a ratio of a current number of user identifiers included in current to a maximum number of user identifiers included in previous participant information.

11. The medium according to claim 7, wherein the process further includes calculating a parameter representing a change in the participant information with time and the change in the participant information is calculated only for information terminals that have stayed n the first place for a predetermined period of time or more.

12. An information processing apparatus, comprising:

a memory; and a processor coupled to the memory and configured to:

obtain, at two or more time points, sensing information transmitted from respective information terminals, the sensing information including a user identifier and place information, the user identifier identifying a user of each of the information terminals, the place information indicating a place at which each of the information terminals resides, assign a first data region to a first event held in a first place, manage participant information including user identifiers that identify users of information terminals residing in the first place on a basis of the obtained sensing information, assign weighted values for the users of information terminals, wherein users of the information terminals who have stored first data in the first data region are assigned different weighted values compared to other users, and determine whether the first event is ended on a basis of the weighted values.

13. The apparatus according to claim 12, wherein the process further includes:

deleting the first data when the first event is determined to be ended.

14. The apparatus according to claim 12, wherein the processor is further configured to calculate a parameter representing a change in the participant information with time the parameter being a difference between a first number of user identifiers included in current participant information and a second number of user identifiers included in previous participant information.

15. The apparatus according to claim 12, wherein the processor is further configured to calculate a parameter representing a change in the participant information with time, the parameter being a ratio of a current number of user identifiers included in current participant information to a maximum number of user identifiers included in previous participant information.

16. The apparatus according to claim 12, wherein the processor is further configured to calculate a parameter representing a change in the participant information with time, the change in the participant information being calculated only for information terminals that have stayed in the first place for a predetermined period of time or more.

* * * * *